United States Patent
Hashimoto et al.

(10) Patent No.: US 8,433,546 B2
(45) Date of Patent: Apr. 30, 2013

(54) RESPONSE SURFACE MODELING DEVICE, RESPONSE SURFACE MODELING METHOD, AND RESPONSE SURFACE MODELING PROGRAM

(75) Inventors: Yoshihiro Hashimoto, Kanagawa (JP); Masami Omori, Kanagawa (JP); Michlo Murase, Kanagawa (JP)

(73) Assignee: Ono Sokki Co., Ltd., Kanagawa (JP)

( * ) Notice: Subject to any disclaimer, the term of this patent is extended or adjusted under 35 U.S.C. 154(b) by 309 days.

(21) Appl. No.: 12/789,887

(22) Filed: May 28, 2010

(65) Prior Publication Data

US 2010/0305921 A1    Dec. 2, 2010

(30) Foreign Application Priority Data

Jun. 2, 2009  (JP) ................................ 2009-133539

(51) Int. Cl.
*G06F 7/60* (2006.01)
*G06F 17/10* (2006.01)
*G06G 7/48* (2006.01)

(52) U.S. Cl.
USPC ................................................ 703/2; 703/6

(58) Field of Classification Search .................. None
See application file for complete search history.

(56) References Cited

U.S. PATENT DOCUMENTS
7,444,190 B2 * 10/2008 Pflugl et al. ............. 700/28

FOREIGN PATENT DOCUMENTS

| | | |
|---|---|---|
| JP | 2002-183111 | 6/2002 |
| JP | 2003-216658 | 7/2003 |
| JP | 2006-132902 | 5/2006 |
| JP | 2008-59106 | 3/2008 |

OTHER PUBLICATIONS

Hafner et al. "Fast neural networks for diesel engine control design", Control Engineering Practices, vol. 8, 2000, pp. 1211-1221.*
Langouet et al. "Optimization for engine calibration", EngOpt 2008, International Conference on Engineering Optimization, Jun. 2008, 10 pages.*
Florian et al. "Improving the Engine Transient Performance using Model-based Predictive Control", Thiesel 2006 Conference on Thermo- and Fluid Dynamic Processes in Diesel Engines, 12 pages.*

* cited by examiner

*Primary Examiner* — Suzanne Lo
(74) *Attorney, Agent, or Firm* — Dilworth & Barrese, LLP

(57) ABSTRACT

A response surface model is created without a drawback of creating a linear model that does not approximate to samples belonging to a partitioned region. Provided are: an input unit 1 that inputs samples composed of factor values and a response value; a sample placement unit 21 that places the samples in spaces, the samples being input by way of the input unit 1; a linear modeling unit 230 that creates the linear model for each region, based on coordinate values of the samples belonging to the region; a region partition unit 22 that partitions the linear model, based on the samples belonging to the region; a partition region determination unit 221 that determines whether it is possible to partition the region, based on the samples belonging to the region to be partitioned; and a modeling unit 23 that creates a response surface model by placing each linear model in the spaces when the partition region determination unit 221 has determined that partition is impossible in all the regions.

6 Claims, 4 Drawing Sheets

US 8,433,546 B2

RESPONSE SURFACE MODELING DEVICE, RESPONSE SURFACE MODELING METHOD, AND RESPONSE SURFACE MODELING PROGRAM

This application is based on and claims the benefit of priority from Japanese Patent Application No. 2009-133539, filed on 2 Jun. 2009, the content of which is incorporated herein by reference.

BACKGROUND OF THE INVENTION

1. Field of the Invention

The present invention relates to a response surface modeling device, a response surface modeling method and a response surface modeling program, for creating a response surface model.

2. Related Art

Conventionally, in the field of measurement, by changing set values (factor values) of a plurality of factors (for example, a throttle opening and a fuel injection timing) serving as input in a device (for example, an automotive engine) as a target for measurement, modeling (creating a response surface model) for calculating a response to an arbitrary factor has been performed, based on a value (response value) obtained by measuring a response (for example, an amount of exhaust gas emissions) serving as output of the factor values.

In a case of using a response surface model when measuring the performance of an automotive engine, a response can be obtained from factors even if the engine is not actually running; therefore, a response surface model can be used as an effective manes for developing an engine. Moreover, in a case of using two elements as factors, a response surface model can be output on a display, etc. by rendering, for example, in a three-axis rectangular coordinate space, in which the factors take the X-axis and the Y-axis, and a response is takes the Z-axis. As a result, it is easy to visually grasp the characteristics of the engine. A device for creating such a response surface model disclosed in Patent Document 1 has been known.

Patent Document 1; Japanese Unexamined Patent Application, Publication No. 2006-132902

SUMMARY OF THE INVENTION

In the aforementioned response surface model, a response can be obtained from an arbitrary factor by forming, for example, a face (linear face or nonlinear face) approximating to all the samples, i.e. a so-called response surface. Various modeling methods (methods of creating an approximate face) can create a response surface model formed in this way depending on characteristics of a response value, and include, for example, a magnification approximation technique, a region partition approximation technique, a high-dimensional polynomial approximation technique, etc. Among the modeling techniques, the region partition technique is considered to be effective in a case in which a change in a response value is desired to be grasped in detail. In the region partition approximation technique (for example, LOLIMOT (Local Linear Model Tree)), a space for placing samples is sectioned (partitioned) to form regions, a response surface is formed in each region, and a response surface model is created based on each response surface. Even a response value that changes in a complicated manner can be treated by a response surface model created in this way with a higher level of approximation.

In a case in which a response surface model according to such a region partition technique is created with a computer, it is required to cause the computer to determine (suspend) partition of a space, and to create a response surface based on the determination. As a conceivable condition for suspending partition, for example, the number of times of partitioning is set in advance without considering distribution of samples (positional relationship of each sample) in the space, and partition is suspended when the number exceeds a predetermined number.

However, in such a case in which a response surface model is created by partition without considering a positional relationship of samples, a drawback has occurred in some cases (a response surface is formed in which a response surface is not created by approximation to the coordinate values of the samples, and a response surface is displayed in which a part of a region is steep, etc.) depending on a position of each sample belonging to the region formed by the partition.

The present invention has been made in view of the aforementioned problem, and it is an object of the present invention to provide a response surface modeling device, a response surface modeling method and a response surface modeling program, for creating a response surface model, without a drawback of creating a linear model that does, not approximate to samples belonging to a partitioned region.

In a response surface modeling device according to the present invention, a plurality of samples, which are coordinate values composed of a plurality of factor values serving as a source to drive a target for measurement, and of a response value calculated as a result of driving, are placed in a plurality of spaces; a linear model, which serves as a face approximating to the plurality of samples thus placed, is created; the linear model is partitioned based on distribution of the samples; and a response surface model, which is composed of a plurality of linear models created based on the samples belonging to a region formed by the partition, is created, and the response surface modeling device includes: an input unit that inputs the samples; a sample placement unit that places the samples in the spaces, the samples being input by way of the input unit; a linear modeling unit that creates the linear model for each region, based on coordinate values of the samples belonging to the region; a region partition unit that partitions the linear model, based on the samples belonging to the region; a partition region determination unit that determines whether it is possible to partition the region, based on a number of the factor values and placement of the samples belonging to the region thus partitioned; and a modeling unit that creates a response surface model by placing each linear model in the spaces, when the partition region determination unit has determined that partition is impossible in all the regions.

Moreover, in the response surface modeling device, it is preferable that it is determined by the partition region determination unit that the partition is impossible, in a case in which a value calculated by Equation (1) is not more than a predetermined threshold value.

$$\det(X_i^T X_i) \qquad (1)$$

Herein, "Xi" is a local matrix of a region i, and "T" is a symbol denoting a transposed matrix.

In addition, in a response surface modeling method according to the present invention, a plurality of samples, which are coordinate values composed of a plurality of factor values serving as a source to drive a target for measurement, and of a response value calculated as a result of driving, are placed in a plurality of spaces; a linear model, which serves as a face approximating to the plurality of samples thus placed, is created; the linear model is partitioned based on distribution of the samples belonging to the linear model; and a response surface model, which is formed of a plurality of linear models created based on the samples belonging to a region formed by partitioning the linear model, is created, and the response surface modeling method includes: placing the samples thus input in the spaces; creating the linear model based on coordinate values of the samples belonging to the region; partitioning the linear model based on the samples; determining whether it is possible to further partition the region thus partitioned, based on the number of the factor values and placement of the samples belonging to the region thus partitioned; and creating a response surface model by placing each linear model in the spaces, when it has been determined that partition is impossible in all the regions.

Furthermore, in the response surface modeling method, it is preferable that it is determined that partition is impossible, in a case in which a value calculated by Equation (2) is not more than a predetermined threshold value.

$$\det(X_i^T X_i) \quad (2)$$

Herein, "Xi" is a local matrix of a region i, and "T" is a symbol denoting a transposed matrix.

Moreover, in a response surface modeling program according to the present invention, a plurality of samples, which are coordinate values composed of a plurality of factor values serving as a source to drive a target for measurement, and of a response value calculated as a result of driving, are placed in a plurality of spaces; a linear model, which serves as a face approximating to the plurality of samples thus placed, is created; the linear model is partitioned based on distribution of the samples belonging to the linear model; and a response surface model, which is formed of a plurality of linear models created based on the samples belonging to a region formed by partitioning the linear model, is created, and the response surface modeling program includes: placing the samples thus input in the spaces; creating the linear model based on coordinate values of the samples belonging to the region; partitioning the linear model based on the samples; determining whether it is possible to further partition the region thus partitioned, based on the number of the factor values and the samples belonging to the region thus partitioned; and creating a response surface model by placing each linear model in the spaces when it has been determined that partition is impossible in all the regions.

In addition, in the response surface modeling program, it is preferable that it is determined that partition is impossible, in a case in which a value calculated by Equation (3) is not more than a predetermined threshold value.

$$\det(X_i^T X_i) \quad (3)$$

Herein, "Xi" is a local matrix of a region i, and "T" is a symbol denoting a transposed matrix.

According to the present invention, it is possible to provide a response surface modeling device, a response surface modeling method and a response surface modeling program, for creating a response surface model, without a drawback of creating a linear model that does not approximate to samples belonging to a partitioned region.

DETAILED DESCRIPTION OF THE INVENTION

Figure 1:
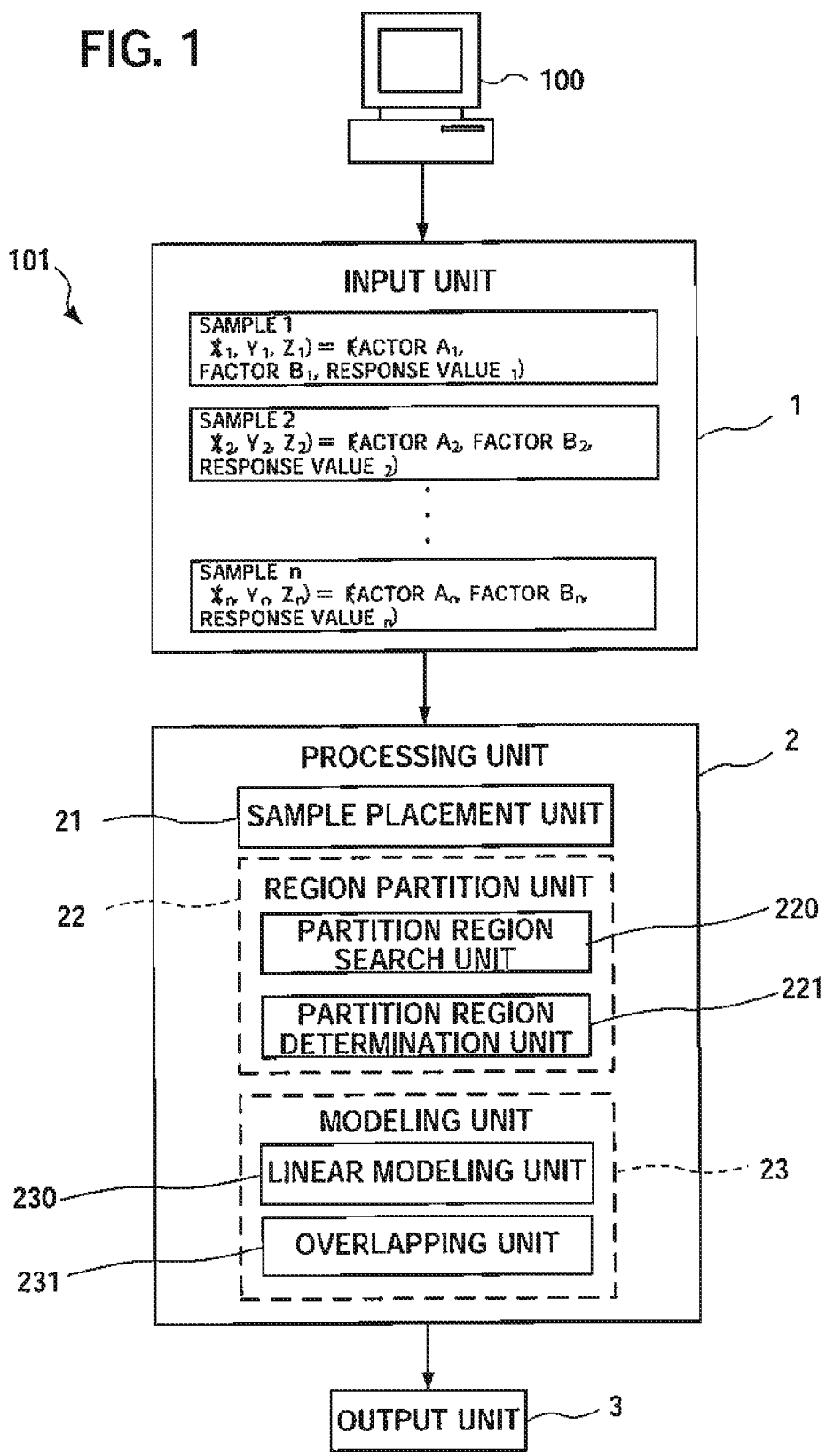
FIG. 1 is a functional block diagram showing functions of a response surface modeling device of the present invention.
Figure 2:
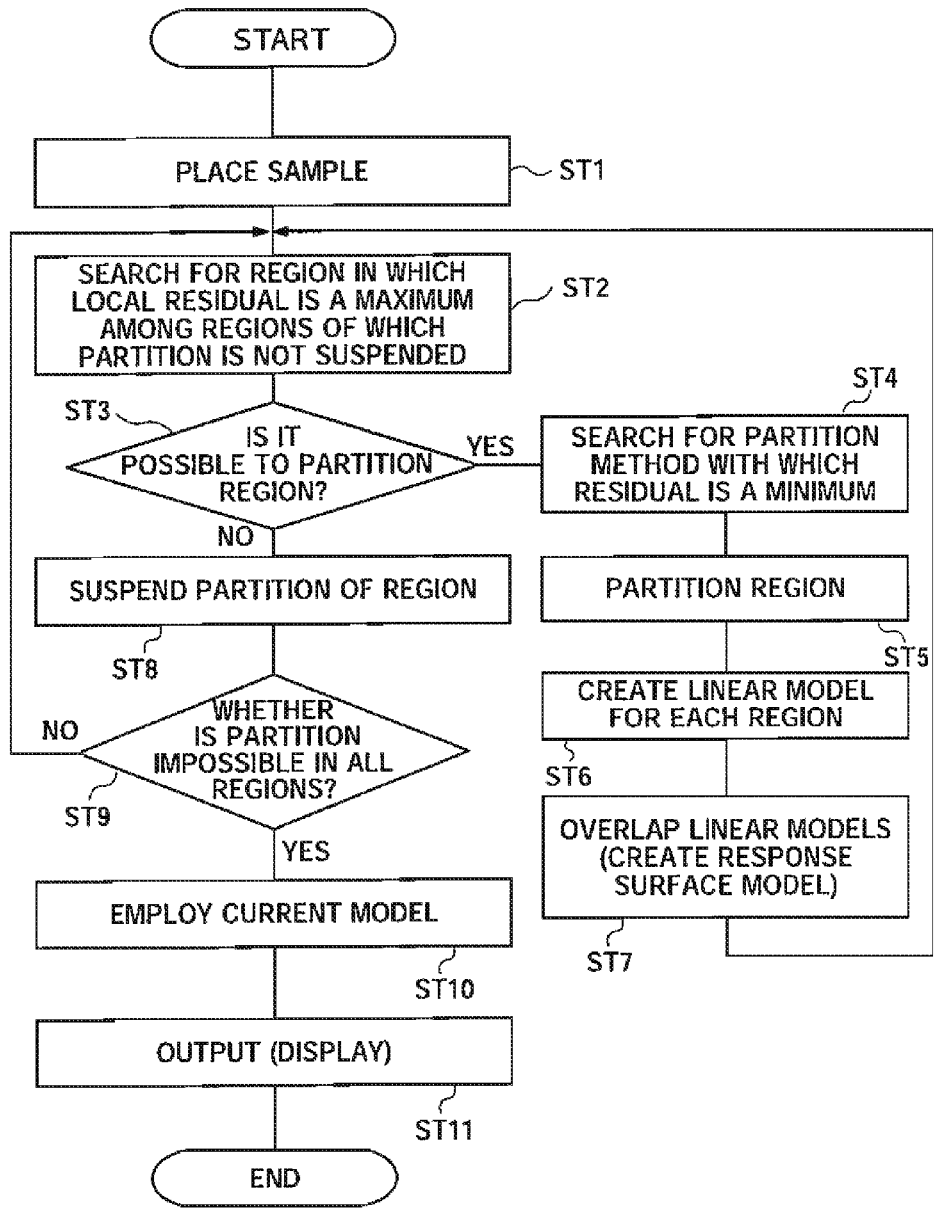
FIG. 2 is a flow chart showing a response surface modeling method of the present invention.
Figure 3A:
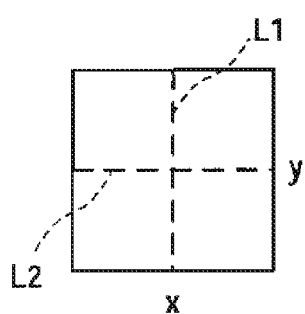
FIG. 3A is a schematic diagram showing response surface modeling, illustrating a factor space before partition.
Figure 3B:
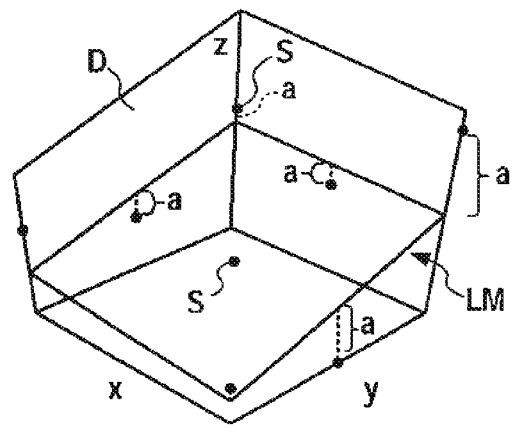
FIG. 3B is a diagram showing response surface modeling, illustrating a rendered linear model corresponding to FIG. 3A.
Figure 3C:
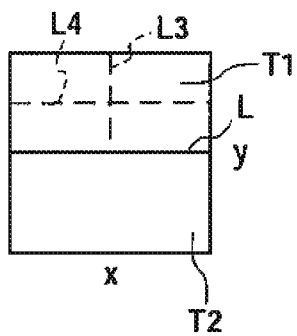
FIG. 3C is a schematic diagram showing response surface modeling, illustrating a factor space of a second partition.
Figure 3D:
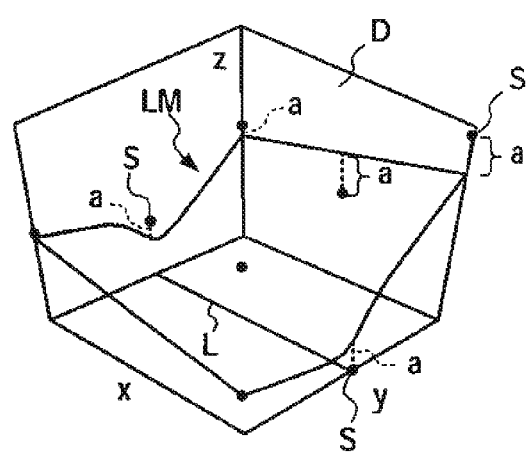
FIG. 3D is a diagram showing response surface modeling, illustrating a rendered linear model corresponding to FIG. 3C.
Figure 3E:
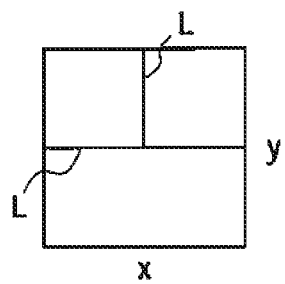
FIG. 3E is a schematic diagram showing response surface modeling, illustrating a factor space of a third partition.
Figure 3F:
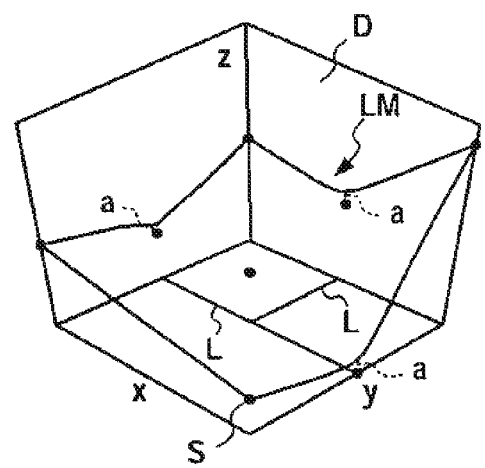
FIG. 3F is a diagram showing response surface modeling, illustrating a rendered linear model corresponding to FIG. 3E.
Figure 4A:
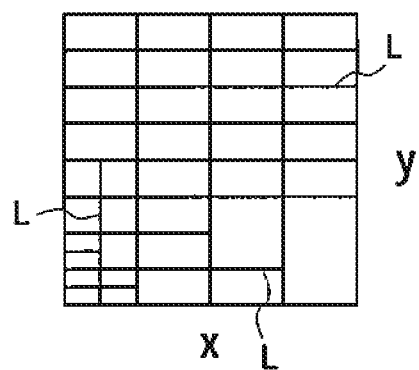
FIG. 4A is a schematic diagram showing a response surface model, illustrating a factor space in a response surface modeling state.
Figure 4B:
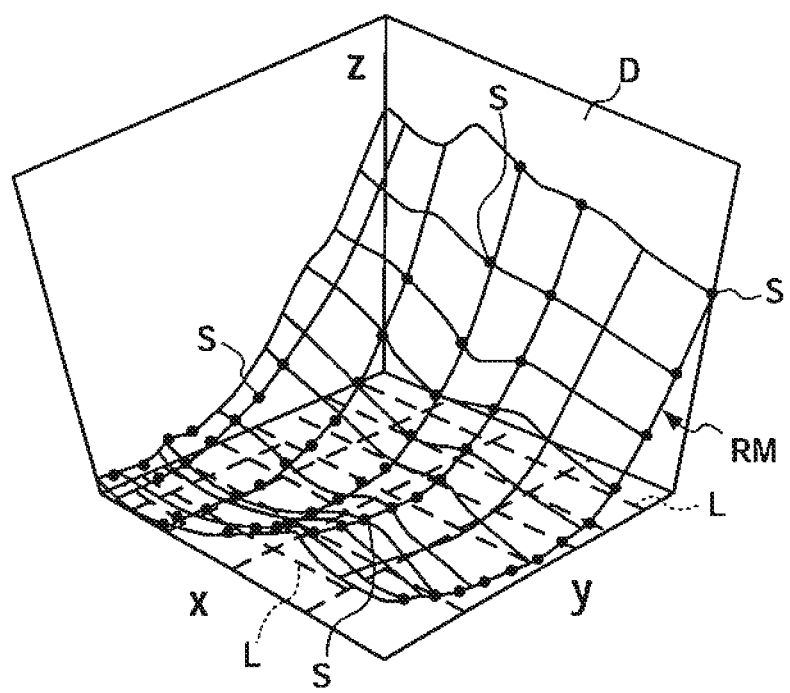
FIG. 4B is a diagram showing response surface modeling, illustrating a rendered linear model corresponding to FIG. 4A.

An embodiment of the present invention is hereinafter described with reference to FIGS. 1 to 4. FIG. 1 is a functional block diagram showing functions of a response surface modeling device of the present invention. FIG. 2 is a flow chart showing a response surface modeling method of the present invention. FIG. 3A is a schematic diagram showing response surface modeling, illustrating a factor space before partition. FIG. 3B is a diagram showing response surface modeling, illustrating a rendered linear model corresponding to FIG. 3A. FIG. 3C is a schematic diagram showing response surface modeling, illustrating a factor space of a second partition. FIG. 3D is a diagram showing response surface modeling, illustrating a rendered linear model corresponding to FIG. 3C. FIG. 3E is a schematic diagram showing response surface modeling, illustrating a factor space of a third partition. FIG. 3F is a diagram showing response surface modeling, illustrating a rendered linear model corresponding to FIG. 3E. FIG. 4A is a schematic diagram showing a response surface model, illustrating a factor space in a response surface modeling state. FIG. 4B is a diagram showing response surface modeling, illustrating a rendered linear model corresponding to FIG. 4A.

A response surface modeling device 101 in the present embodiment includes: an input unit 1 that inputs data from outside; a processing unit 2 that processes (calculates) data from the input unit 1 to create a response surface model; and an output unit 3 that renders a response surface model created by the processing unit 2 and outputs it on a display, etc. It should be noted that, although the following description assumes that the functions are executed by the processing unit 2, it is not limited thereto, and the functions may be executed by other substantial parts. Moreover, a response surface model created in the present embodiment is created in accordance with a creation method according to LOLIMOT (Local Linear Model Tree) among region partition approximation techniques in a response surface methodology. In addition, the following description is based on an assumption that the response surface modeling device 101 in the present embodiment renders a response surface model in a three-dimensional space.

The input unit 1 inputs data from an external device (an engine performance measuring device 100 in the present embodiment), etc. Data to be input is: a plurality of factors serving as a source to drive a target for measurement; and a response (response value) produced by driving the target for measurement using the factors (factor values). The input unit 1 performs input as a sample S combining the factor values and the response value. It should be noted that the factor values and the response value are coordinate values in the sample S.

More specifically, the target for measurement is an automotive engine. Furthermore, among the two types of factors, one factor is revolution speed of an engine (hereinafter simply referred to as revolution speed). Another factor is torque. Moreover, the response is a NOx emission amount (Nitrogen Oxide x: hereinafter simply referred to as NOx).

In other words, the sample S is a result of measuring NOx emitted (calculated) when running an engine in a state in which revolution speed or torque is changed, and the sample S has revolution speed and torque serving as factors and coordinate values of NOx serving as a response.

It should be noted that, although the factors are revolution speed and torque and the response is NOx in the present embodiment, it is not limited thereto.

In the present embodiment, the factor values are set by way of the engine performance measuring device 100 connected to the engine. In addition, the response value is measured by running the engine that has been setup on the engine performance measuring device 100. The engine performance measuring device 100 obtains engine measurement data serving as a response value, in the following configuration.

The engine performance measuring device 100 is configured with: a throttle actuator that changes a throttle opening of the engine; a revolution speed sensor that detects a revolution speed of the engine; a clutch that is connected to a load such as a dynamo; a control unit that controls the throttle actuator, the clutch and the engine; and a data collection unit.

The data collection unit measures NOx emitted when running the engine while gradually changing the revolution speed and the torque, and eventually converts the measurement into a sample that is a combination of factors (revolution speed and torque) and a response (NOx).

The processing unit 2 includes a sample placement unit 21, a region partition unit 22, and a modeling unit 23.

As shown in FIG. 3B, based on coordinate values, the sample placement unit 21 places the sample S in a three-dimensional space D of a rectangular coordinate system, in which factor values (revolution speed and torque) are an X component (X-axis) and a Y component (Y-axis), and a response value (NOx) is a Z component (Z-axis).

A region partition unit 22 includes a partition region search unit 220 and a partition region determination unit 221. In addition, the region partition unit 22 partitions a linear model LM that has been created by way of the modeling unit 23 to be described later.

Partition of a region is performed by sectioning a linear model by way of a partitioning line L. As a result, each region formed by partition is classified for its attribute in the sample S. Furthermore, partition of a region is performed in accordance with a predetermined principle. In the present embodiment, partition of a region is performed by drawing partitioning lines L1 and L2 in the linear model LM from an X-axis direction or a Y-axis direction as shown in FIG. 3A such that the linear model LM is segmented in the three-dimensional space D. It should be noted that FIGS. 3A, 3C and 3E are two dimensional illustrations of the three-dimensional space D as a space (factor space) formed by way of the X-axis and the Y-axis.

When the linear model LM is partitioned by way of the region partition unit 22, the partition region search unit 220 searches for a region in which local residual is a maximum in the linear model LM.

Moreover, the partition region search unit 220 searches for a partition method with which residual is a minimum by partition. The search for a partition method is performed by searching for a partition method with which residual is a minimum among possible partition methods.

For example, in a case as shown in FIGS. 3C and 3D, when partitioning a region T1 among regions T1 and T2 partitioned by a partitioning line L, the partition region search unit 220 selects any one of a method to partition by a partitioning line L3 and a method to partition by a partitioning line L4. In addition, the partition region search unit 220 calculates residuals in a case of partitioning by way of a selected partition method. The partition region search unit 220 compares residuals for each partition method, and searches for (selects) a partition method with which residual is a minimum.

In the partition method searched by the partition region search unit 220, the partition region determination unit 221 determines for each formed region whether samples S belonging to a region are placed in a manner inappropriate for creating a linear model LM.

By determining such inappropriate placement, the partition region determination unit 221 determines, for example, a state in which samples S are placed substantially on a straight line in a region, a state in which three samples S are placed at extremely short distances from one another in a region (a state in which a triangular area formed by linking the three samples S is not more than a predetermined threshold value), etc.

Based on this determination result, the partition region determination unit 221 determines not to partition by way of the partition method (suspension of partition). It should be noted that, in a case in which a linear model LM is created in a region with a state as described above, there is a possibility that a linear model (steep linear model) that does not approximate to the samples S in the region may be created.

The modeling unit 23 includes a linear modeling unit 230 and an overlapping unit 231. Furthermore, as shown in FIG. 3E, in a case in which it has been determined that partition is impossible in all the regions, the modeling unit 23 determines the current model as a response surface model RM.

Based on coordinate values of samples S belonging to a predetermined region, the linear modeling unit 230 creates a linear model LM that becomes a face approximating to coordinate values of all the samples S belonging to this region (refer to FIG. 3F).

The overlapping unit 231 causes each linear model LM corresponding to all the regions created in the linear modeling unit 230 to overlap. Overlapping of each linear model LM can be performed by linking portions that would be crossed when adjacent linear models are extended to each other.

Moreover, overlapping of linear models LM can also be performed by causing intersection points of end portions of adjacent linear models LM to overlap as an overlapping portion. In addition, overlapping of linear models LM can be performed such that the linear models overlap each other with a smooth curve in order to reduce residual in the overlapping portion between the linear models. The curvature of the curve is determined by converting weight in each linear model LM.

The output unit 3 renders a response surface model RM created by the processing unit 2, and outputs (displays) it via a display or the like (refer to FIG. 4B).

The response surface modeling device 101 that is configured as described above has a function to create a response surface model RM and to output it on a display or the like, based on samples S obtained from the engine performance measuring device 100. In this case, since partition is suspended due to placement of samples S in a region, the response surface modeling device 101 can create a response surface model RM and output it without a drawback of creating a linear model LM that does not have a relationship approximating to the samples S.

Here, a method of creating a response surface model RM is described with reference to a flow chart shown in FIG. 2.

In Step ST1, in a rectangular coordinate system in which revolution speed is an X-axis component, torque is a Y-axis component, and NOx is a Z-axis component, the sample placement unit 21 places samples S, which have been input by way of the input unit 1, in a three-dimensional space D in which a predetermined value is an upper limit. The sample S is placed based on coordinate values of the three-dimensional space D.

Next, the linear modeling unit 230 creates a linear model LM as shown in FIG. 3B, based on each coordinate value (revolution speed, torque, and NOx) of the samples S. More specifically, the linear model LM is formed based on a value calculated using the following equation (4).

$$\hat{y} = W \begin{pmatrix} 1 \\ \vec{x} \end{pmatrix} \quad (4)$$

Herein, "$\hat{y}$" is a response value (NOx in the present embodiment), "W" is a coefficient of a linear model, and "x" is a factor value (revolution speed and torque in the present embodiment).

In Step ST2, the partition region search unit 220 searches for a region in which local residual is a maximum among regions of which partition has not been suspended yet. Particularly, for example, in the case shown in FIGS. 3C and 3D, the partition region search unit 220 compares residuals a of samples S belonging to regions T1 and T2 formed along the partitioning line L as a boundary thereof and residual a of the linear model LM, and selects a region in which residual is a maximum. It should be noted that, since a linear model LM as a comparison target does not exist immediately after creating the linear model LM (in a case in which partition of the linear model LM has never been performed), a search is not performed for a region in which local residual (residuals for each partitioned region) is a maximum. In this step, the partition region search unit 220 selects a region to be partitioned.

In Step ST3, the partition region determination unit 221 determines a possible partition method in the region determined in Step ST2. In other words, the partition region determination unit 221 determines whether a linear model LM approximating to samples S belonging to the region would be created in a case in which a linear model LM is created by partition using the possible partition method. In this determination, inappropriate placement of samples S for creating a linear model LM is determined. In the present embodiment, inappropriate placement of samples S belonging to a region is, for example, a state in which samples S are placed substantially on a straight line, or a state in which three samples S are at short distances (a state in which a triangular area linking the samples S is not more than a predetermined area). It should be noted that, in a case in which a linear model LM is created in a state of such inappropriate placement, a steep linear model LM that does not approximate to samples S is created, thereby causing a drawback.

More specifically, the partition region determination unit 221 determines partition by using a D optimum criterion (D-Optimality) that is an optimization criterion of a computer-aided experimental design. It is determined whether a value calculated by calculating a determinant with the following equation (5) is more than a threshold value. It should be noted that the threshold value is determined, for example, by way of a result obtained by measuring an occurrence pattern of errors by a test, etc.

$$\det(X_i^T X_i) \quad (5)$$

Herein, "Xi" is a local matrix of a region i, and "T" is a symbol denoting a transposed matrix.

In a case in which the value calculated by equation (5) is more than a threshold value, it is determined that partition is possible, and the processing proceeds to Step ST4. On the other hand, in a case in which the value calculated by equation (5) is not more than a threshold value, it is determined that partition is impossible, and the processing proceeds to Step ST8.

In Step ST4, the partition region search unit 220 searches for a partition method with which residual is a minimum. In the case shown in FIG. 3C, the partition region search unit 220 searches for a partition method with which residual is a minimum in a region T1, among a partition method to partition by a partitioning line L3 and a partition method to partition by a partitioning line L4. More specifically, the search is performed by comparing residuals in all the regions formed by partition for each partition method. In the present embodiment, the partition method to partition by the partitioning line L3 can minimize residual. It should be noted that the symbol "a" shown in FIGS. 3B, 3D and 3F denotes a difference between the sample S and the linear model LM, i.e. residual, as a line.

In the present embodiment, determination of partition possibility in Step ST3 and a search for a partition method in Step ST4 are actually performed in parallel. In other words, partition possibility and residual is respectively examined for each partition method, and a partition method with which residual is a minimum is searched for among partition methods that can perform partition. In a case in which none of the partition methods can perform partition, the processing proceeds to Step ST8.

In Step ST5, the region partition unit 22 performs partition according to the partition method searched by the partition region search unit 220. In the case shown in FIGS. 3C and 3D, since a method to partition by the partitioning line L3 has been searched for, partition is performed by way of the method to partition by the partitioning line L3 (refer to FIG. 3E). In this way, the response surface modeling device 101 determines a partition method with which residual is a minimum, and thus can create a linear model LM that is more approximate to the samples S.

In Step ST6, the linear modeling unit 230 creates a linear model LM based on each coordinate value of the samples S belonging to each partitioned region.

In Step ST7, the overlapping unit 231 performs overlapping of each linear model LM. Overlapping of the linear models LM is performed by connecting linear models of each region created in Step ST5. Moreover, although overlapping of linear models LM can also be performed by connecting end portions of adjacent linear models LM, in the present embodiment, a non-linear face is eventually formed so as to cause adjacent linear models LM to smoothly overlap in order to reduce residual in the overlapping portion between the linear models.

In the present embodiment, creation of linear models LM in Step ST6 and overlapping thereof in Step ST7 are performed at the same time. More specifically, an overlapped linear model LM is created by calculating equation (8) using values obtained by calculating the following equations (6-1), (6-2), (7-1) and (7-2).

It should be noted that the equations (6-1) and (6-2) correspond to weighting of each region for smooth overlapping of linear models performed by the overlapping unit 231 in Step ST7. In addition, the equations (7-1) and (7-2) correspond to creation of a local model (a linear model LM created for each region) performed by the linear modeling unit 230 in Step ST6. Furthermore, equation (8) corresponds to creation of an overlapped linear model LM performed by the linear modeling unit 230 and the overlapping unit 231. Accordingly, in the present embodiment, linear models LM are created and overlapped with each other at the same time.

$$\mu_i(\vec{x}) = esp\left[-\frac{1}{2}(\vec{x}-\vec{c_i})^T V^{-1}(\vec{x}-\vec{c_i})\right] (i=1,\ldots,M) \quad (6\text{-}1)$$

where $$V := \begin{pmatrix} (\sigma W_{i1})^2 & & o \\ & \ddots & \\ o & & (\sigma W_{in})^2 \end{pmatrix}$$

("Wij" is a width of a region i for a coordinate j.)

$$\Phi(\vec{x}) := \begin{pmatrix} \Phi_1(\vec{x}) \\ \vdots \\ \Phi_\infty(\vec{x}) \end{pmatrix} \quad (6\text{-}2)$$

where $$\Phi_i(\vec{x}) := \frac{\mu_1(\vec{x})}{\sum_{j=1}^N \mu_j(\vec{x})}$$

Herein, "y" is a response value (NOx in the present embodiment), "exp" is an exponent, "ci" is a center of a region, "x" is a factor value (revolution speed and torque in the present embodiment), "M" is a region partition number, "W" is a coefficient of a linear model, "μi" is a value defined in the equation (6-1), and "φ" is a vector.

$$W := (\vec{w}_1, \ldots, \vec{w}_M) \in R^{M(n+t)} \quad (7\text{-}1)$$

where $$y = \vec{w}_i^T \begin{pmatrix} 1 \\ \vec{x} \end{pmatrix}$$

on nbd of $\vec{c_i}$ $$\vec{w}_i = X_i^T X_i \vec{w}_i = X_i^T \vec{y} \quad (7\text{-}2)$$

Herein, "W" is a coefficient of a linear model, "m" is a region partition number, "R" is a symbol denoting a real number, "y" is a response value (NOx in the present embodiment), "x" is a factor value (revolution speed and torque in the present embodiment), "on nbd of" is a vicinity, and "ci" is a center of a region i.

In addition, equation (7-2) is calculated under the following conditions.
resulting in:

$$X := \begin{pmatrix} 1 & \vec{x}_1^T \\ \vdots & \vdots \\ 1 & \vec{x}_N^T \end{pmatrix};$$

resulting in:

$$P_i := \begin{pmatrix} \Phi_i(\vec{x}_i) & & o \\ & \ddots & \\ o & & \Phi_i(\vec{x}_N) \end{pmatrix};$$

and
resulting in $$X_i := \begin{cases} P_i^{1/2} X & \text{Isermann Method} \\ P_i X & \text{Scilab Method} \end{cases}$$

In addition, "$\vec{x}_1,\ldots,\vec{x}_n$," are the sample points (N: the number of samples), and "$\vec{w}_1$," as a solution is obtained.

This makes it possible to minimize local residuals $$R_i := \begin{cases} \sum_{j=1}^N \Phi_i(\vec{x}_j)(y_j - \hat{y}_j)^2 & \text{Isermann Method} \\ \sum_{j=1}^N \Phi_i(\vec{x}_j)^2(y_j - \hat{y}_j) & \text{Scilab Method} \end{cases}$$

Herein, "X" is a design matrix, "N" is the number of samples, "x" is a factor value (revolution speed and torque in the present embodiment), "$w_i$" is a coefficient of a local linear model of a region i, "y" and "$\hat{y}$" are response values (NOx in the present embodiment), "T" is a symbol denoting a transposed matrix, "n" is the number of samples, "Φ" is a vector defined by Equation (6-2), and "$R_i$" is a local residual in a region i.

$$\hat{y} = \vec{\Phi}(\vec{x})^T W^T \begin{pmatrix} 1 \\ \vec{x} \end{pmatrix} \quad (8)$$

$\vec{\Phi}(\vec{x})^T$ is a weighting value calculated with Equation (6-2).

Herein, "ŷ" is a response value (NOx in the present embodiment), "Φ" is a vector defined by Equation (6-2), "x" is a factor value (revolution speed and torque in the present embodiment), "T" is a symbol denoting a transposed matrix, and "W" is a coefficient of a linear model.

The response surface modeling device 101 further performs partition and the like based on the created linear models LM. In other words, in the response surface modeling device 101, the processing returns to Step ST2. In the present embodiment, the partition region search unit 220 searches for a region in which local residual is a maximum by partition by the partitioning line L3 (Step ST2). In addition, in this region, the partition region determination unit 221 and the region partition unit 22 determine that partition is possible, and perform partition (Steps ST3, ST4 and ST5). Furthermore, by way of this partition, the linear modeling unit 230 creates a linear model LM for each region (Step ST6). Moreover, the overlapping unit 231 performs overlapping of a linear model group created by the linear modeling unit 230 (Step ST7).

In addition, in a case in which a region has been partitioned, the response surface modeling device 101 determines placement inappropriate for creating a linear model LM for all the samples S, in the three-dimensional space D of the samples S belonging to the region (Step ST3). In a case in which it has been determined that partition is possible, the flow starting from Step ST4 to Step ST7 and returning to Step ST2 is repeated again.

In a case in which it has been determined that partition of each partition is impossible in Step ST3, the processing proceeds to Step ST8.

In Step ST8, the region partition unit 22 suspends partition of a region of which partition has been determined to be impossible in Step ST3, as a region of which partition is impossible, and the processing proceeds to Step ST9. Suspension of partition refers to processing with which a linear model LM is not created from a partitioned region (processing to determine a region as a region that will not be partitioned).

In Step ST9, the region partition unit 22 determines whether all the regions are partition-suspension regions. In a case in which all the regions have been determined as partition-suspension regions, the processing proceeds to Step ST10. It should be noted that, in a case in which it has not been determined that all the regions are partition-suspension regions, the processing returns to Step ST2, and the processing of Steps ST2 to ST8, such as partition determination of a linear model LM by way of another region and partition method, is performed again.

In Step ST10, the response surface modeling device 101 employs the current model (linear model LM) as a response surface model RM (refer to FIGS. 4A and 4B).

In Step ST11, the output unit 3 renders the created response surface model RM, and outputs it to a displaying means such as a display (refer to FIGS. 4A and 4B).

In such a configuration, the response surface modeling device 101 can create a response surface model RM by obtaining samples S by way of the input unit 1. In doing so, partition is suspended in order not to create a linear model LM when samples S are placed in a partitioned region in placement inappropriate for creating a linear model LM, for example, such as a state of being placed on a straight line in the three-dimensional space D, or a state in which three samples S are placed at short distances (a state in which a triangular area linked by the samples S is not more than a predetermined area); therefore, a drawback such as forming a linear model that is far apart from values of actual samples S (a linear model that does not approximate to samples S) will not occur. As a result, modeling for calculating a response to arbitrary factors can be performed.

A response surface model RM that is formed in this way can grasp a response from arbitrary factor values (revolution speed and torque), and can serve for setting ECU (Engine Control Unit) of an engine.

In addition, the response surface modeling device 101 renders a created response surface model RM, and displays it via a displaying means such as a display, thereby making it possible to visually grasp characteristics of the response.

Although a preferred embodiment of the response surface modeling device 101 and the response surface modeling method according to the present invention have been described above, the response surface modeling device 101 and the response surface modeling method according to the present invention are not limited to the aforementioned embodiment, and can be implemented in various manners.

It should be noted that, although revolution speed and torque are used as factor values and NOx is used as a response value corresponding to the factor values in the present embodiment, it is not limited thereto. The factor values may be running factors for an engine, and may be, for example, a fuel injection timing, an EGR rate, a common-rail injection system pressure, etc. Moreover, the response value may be a running result calculated as a result of running an engine using factor values, and may be, for example, fuel efficiency, etc.

In addition, although a region is segmented in accordance with a predetermined partition principle in the present embodiment, it is not limited thereto. Depending on a position of partitioning a factor space in a region that can be partitioned, positions of the partitioning lines can be determined by way of various methods, such as, for example, segmenting a rectangular factor space surrounded by an X-axis and a Y-axis, determining by variance of factor values or variance of response values, etc.

Furthermore, although a response surface model is created in a three-dimensional space by way of two factor elements in the present embodiment, it is not limited thereto. It is possible to create a multidimensional response surface model that is not limited to three dimensions by using two or more factors. In doing so, for example, by way of a D optimum criterion that is an optimization criterion of a computer-aided experimental design, suspension of partition is determined for a state in which samples are placed on substantially the same plane in a case of three factors, or a state in which a tetrahedral volume is not more than a predetermined threshold value in a case of four samples belongings to a region, whereby making it possible to create a response surface model without a drawback.

What is claimed is:

1. A response surface modeling device, comprising:
executing instructions to a processor
create a linear model by changing a plurality of factor values, drive a target for measurement, resulting in a response value calculated as a result of such driving, using input values as the plurality of factor values, and substitute a sample into Equation (1), the sample being obtained by using input values as the plurality of factor values, and an output value as the response value;
determine to partition the linear model, when a value calculated by Equation (2) is greater than a threshold;
partition the linear model, when the processor determines to partition the linear model; and
create a response surface model by determining whether to further partition each region of the linear model partitioned by the partitioning unit, and when the processor determines that each region cannot be further partitioned, a sample belonging to each region partitioned is substituted into Equation (1) to create a linear model, and adjacent linear models are connected to each other to create a response surface model, $$\hat{y} = W(1/x) \quad \text{(Equation 1)}$$

wherein "$\hat{y}$" is a response value, "W" is a coefficient of a linear model, and "x" is a factor value, and $$\det(x_i^T x_i) \quad \text{(Equation 2)}$$

wherein "Xi" is a local matrix of a region i, and "T" is a symbol denoting a transposed matrix;
a memory effective to store the plurality of factor values, the response value, and the response surface model; and
a display to display the response surface model.

2. The response surface modeling device according to claim 1, wherein the processor is further effective to allow the adjacent linear models to be smoothly connected to each other by non-linear processing.

3. A response surface modeling method performed by a response surface modeling device including a processor, a memory and a display, the method comprising the steps of:
creating by the processor a linear model by changing a plurality of factor values, driving by the processor a target for measurement, resulting in a response value calculated as a result of such driving, using input values as the plurality of factor values, and substituting by the processor a sample into Equation (1), the sample being obtained by using input values as the plurality of factor values, and an output value as the response value;

determining by the processor to partition the linear model, when a value calculated by Equation (2) is greater than a threshold;

partitioning by the processor the linear model, when the processor determines to partition the linear model; and creating by the processor a response surface model by determining whether to further partition each region of the linear model partitioned in the partitioning step, and when it is determined that each region cannot be further partitioned, substituting by the processor a sample belonging to each region partitioned in the partitioning step into Equation (1) to create a linear model, and connecting by the processor adjacent linear models to each other to create a response surface model, $$\hat{y}=W(1/x) \qquad \text{(Equation 1)}$$

wherein "ŷ" is a response value, "W" is a coefficient of a linear model, and "x" is a factor value, and $$\det(x_i^T x_i) \qquad \text{(Equation 2)}$$

wherein "Xi" is a local matrix of a region i, and "T" is a symbol denoting a transposed matrix;

storing by the processor in the memory the plurality of factor values, the response value, and the response surface model; and displaying by the processor on the display the response surface model.

4. The response surface modeling method according to claim 3, further comprising allowing by the processor the adjacent linear models to be smoothly connected to each other by non-linear programming.

5. A nontransitory computer program readable medium incorporated into a machine, including a processor, a memory and a display, tangibly embodying a response surface modeling program including instructions executable by the machine to perform method steps for:

creating by the processor a linear model by changing a plurality of factor values, driving by the processor a target for measurement, resulting in a response value calculated as a result of such driving, using input values as the plurality of factor values, and substituting by the processor a sample into Equation (1), the sample being obtained by using input values as the plurality of factor values, and an output value as the response value;

determining by the processor to partition the linear model, when a value calculated by Equation (2) is greater than a threshold;

partitioning by the processor the linear model, when the processor determines to partition the linear model; and creating by the processor a response surface model by determining by the processor whether to further partition each region of the linear model partitioned by the partitioning means, and when the processor determines that each region cannot be further partitioned, substituting by the processor a sample belonging to each region partitioned into Equation (1) to create a linear model, and connecting by the processor adjacent linear models to each other to create response surface model, $$\hat{y}=W(1/x) \qquad \text{(Equation 1)}$$

wherein "ŷ" is a response value, "W" is a coefficient of a linear model, and "x" is a factor value, and $$\det(x_i^T x_i) \qquad \text{(Equation 2)}$$

wherein "Xi" is a local matrix of a region i and "T" is a symbol denoting a transposed matrix;

storing by the processor in the memory the plurality of factor values, the response value, and the response surface model; and displaying by the processor on the display the response surface model.

6. The nontransitory computer readable medium according to claim 5, the computer program further comprising instructions executed by the processor the adjacent linear models to be smoothly connected to each other by non-linear processing.

* * * * *